(12) United States Patent
Hong et al.

(10) Patent No.: US 6,741,311 B1
(45) Date of Patent: May 25, 2004

(54) REFLECTIVE TYPE-FRINGE SWITCHING MODE LCD HAVING LIQUID CRYSTAL RETARDATION (2N+1)λ/4

(75) Inventors: Seung Ho Hong, Kyoungki-do (KR); Seung Hee Lee, Kyoungki-do (KR)

(73) Assignee: Boe-Hydis Technology., Ltd., Kyoungki-do (KR)

( * ) Notice: Subject to any disclaimer, the term of this patent is extended or adjusted under 35 U.S.C. 154(b) by 141 days.

(21) Appl. No.: 09/607,014

(22) Filed: Jun. 29, 2000

(30) Foreign Application Priority Data

Jun. 29, 1999 (KR) ........................ 1999-25214

(51) Int. Cl.[7] ..................... G02F 1/1335; G02F 1/1343
(52) U.S. Cl. ...................... 349/141; 349/113; 349/181
(58) Field of Search ............................... 349/113, 141, 349/181

(56) References Cited

U.S. PATENT DOCUMENTS

| | | | | |
|---|---|---|---|---|
| 3,837,729 | A | * | 9/1974 | Harsch ..................... 349/178 |
| 4,542,960 | A | | 9/1985 | Yang |
| 5,309,264 | A | | 5/1994 | Lien et al. |
| 5,576,862 | A | | 11/1996 | Sugiyama et al. |
| 5,598,285 | A | * | 1/1997 | Kondo et al. .............. 349/39 |
| 5,844,644 | A | * | 12/1998 | Oh et al. ................... 349/95 |
| 5,959,708 | A | | 9/1999 | Lee et al. |
| 6,147,727 | A | * | 11/2000 | Shigeno ..................... 349/99 |
| 6,184,957 | B1 | * | 2/2001 | Mori et al. ................ 349/118 |
| 6,204,904 | B1 | * | 3/2001 | Tillin et al. ............... 349/119 |
| 6,266,116 | B1 | * | 7/2001 | Ohta et al. ................ 349/141 |
| 6,281,952 | B1 | * | 8/2001 | Okamoto et al. .......... 349/12 |
| 6,323,927 | B1 | * | 11/2001 | Hiroshi ..................... 349/141 |
| 6,341,001 | B1 | * | 1/2002 | Kwok ........................ 349/96 |

FOREIGN PATENT DOCUMENTS

| | | |
|---|---|---|
| JP | 60222825 | 11/1985 |
| JP | 11167120 | 6/1999 |
| JP | 11282427 | 10/1999 |

OTHER PUBLICATIONS

Mourant et al., "Evidence of Intrinsic Differences in the Light Scattering Properties of Tumorigenic and Nontumorigenic Cells" Cancer (Cancer Cytopathology), vol. 84, No. 6, p. 366–374, 1998.*

* cited by examiner

Primary Examiner—Tarifur R. Chowdhury
Assistant Examiner—Andrew Schechter
(74) Attorney, Agent, or Firm—Ladas & Parry

(57) ABSTRACT

A reflective type FFS-LCD includes: a liquid crystal layer; a first substrate formed with counter and pixel electrodes on one side of the liquid crystal layer to generate a fringer field to drive the liquid crystal molecules; a second substrate on the other side of the liquid crystal layer; a first homogeneous alignment layer near the first substrate having a rubbing axis in a selected direction; a second homogeneous alignment layer near the second substrate and having a rubbing axis in a selected direction; a polarizer having a selected polarizing axis; and a reflective plate. Retardation occurs in the liquid crystal layer by $(2n+1)\lambda/4$ when the liquid crystal molecules in the liquid crystal layer are driven by the fringe field.

11 Claims, 11 Drawing Sheets

$d\Delta n\ (\mu m)$ $\lambda = 570\ nm$

REFLECTIVE TYPE-FRINGE SWITCHING MODE LCD HAVING LIQUID CRYSTAL RETARDATION (2N+1)λ/4

FIELD OF THE INVENTION

The present invention relates to a reflective type liquid crystal display, more particularly to a reflective-type fringe field switching mode LCD(hereinafter, reflective FFS-LCD) capable of improving a reflection rate thereof.

BACKGROUND OF THE INVENTION

A twisted nematic(TN) mode LCD having nematic liquid crystal compositions of positive dielectric anisotropy has been used for the conventional reflective type LCD. This reflective type TN-LCD has a low power consumption property and is used for relatively small size LCDs of an electronic clock, a digital clock and so on. However, the reflective TN-LCD has chronic problems of a poor viewing angle and a low contrast ratio.

Consequently, a reflective FFS-LCD device is now in the process of research and development to ensure a good viewing angle property, a high reflective rate and an aperture ratio. The composition of this conventional reflective FFS-LCD device is approximately illustrated in FIGS. 1 and 2.

Referring to FIGS. 1 and 2, a lower substrate 10 is opposed to an upper substrate 15 at a selected distance. A liquid crystal layer 17 having a plurality of liquid crystal molecules is interposed between the lower substrate 10 and the upper substrate 15. A counter electrode 11a and a pixel electrode 11b forming a fringe field to operate the liquid crystal molecules, are disposed on the inside surface of the lower substrate 10. A color filter(not shown) is disposed on the inside surface of the upper substrate 15. A first homogeneous alignment layer 12 is interposed between the lower substrate 10 including the counter electrode 11a and the pixel electrode 11b, and the liquid crystal layer 17. A second homogeneous alignment layer 16 is interposed between the upper substrate 15 including the color filter and the liquid crystal layer 17. At this time, the first and the second homogeneous alignment layers 12, 16 have rubbing axes R1,R2 respectively, and the rubbing axis R1 of the first homogeneous alignment layer 12 and the rubbing axis R2 of the second homogeneous alignment layer 16 form 180°, i.e. anti-parallel to each other. In addition, the rubbing axis R1 forms a selected angle with a line f which on the substrate surface, projects the fringe field that is formed between the counter electrode 11a and the pixel electrode 11b. A polarizer 8 is attached on the outside surface of the upper substrate 5 so that polarizing axis 8a thereof is equal to the rubbing axis R1 of the first homogeneous alignment layer 12. A λ/4 plate 19 polarizing an incident light or a reflected light by λ/4 is disposed on the outside surface of the lower substrate 10. On the outside of the λ/4 plate 19, a reflective plate 20 reflecting the light which passes through the λ/4 plate 19, is disposed. At this time, the λ/4 plate 19 is disposed so that a fast (or slow) axis thereof is at an angle of 45° with the first rubbing axis (R1).

Such conventional reflective-type FFS-LCD operates as following.

First, referring to FIG. 1, when voltage difference does not occur between the counter electrode 11a and the pixel electrode 11b, the liquid crystal molecules (not shown) are arranged so that the rubbing axes R1, R2 and the long axes thereof are parallel. Consequently, a natural light 22a becomes an incident light 22b proceeding to the same direction as a polarization axis 18a by passing through a polarizer 18. Thereafter, the direction of the incident light 22b is not changed while passing through the liquid crystal layer 17 which the rubbing axes R1, R2 and the long axes of the liquid crystal molecules are arranged side by side thereon. The incident light 22b which has passed through the liquid crystal layer 17, is at an angle of 45° with the fast (or slow) axis of the λ/4 plate 19, thereby becoming a right-circularly polarized light 22c passing through the λ/4 plate 19. The right-circularly polarized light 22c is reflected b a reflective plate 20, thereby becoming a left-circularly polarized reflected light 23a.

The reflected light 23a becomes the reflected light 23a proceeding to a crossing direction with the axis of the polarized light 18a, passing through the λ/4 plate 19 having the fast (or slow) axis at an angle of 45° with the proceeding direction thereof. The proceeding direction of the reflected light 23b which has passed through the λ/4 plate 19, is orthogonal to the long axis of the liquid crystal layer 17, thereby passing through the liquid crystal layer 17 without being changed. The reflected light 22b which has passed the liquid crystal layer 17, is orthogonal to the polarizing axis 18a, thereby not passing through the polarizer 18. Accordingly, a screen becomes dark.

Next, like FIG. 2, when a fringe field F is formed between the counter electrode 11a and the pixel electrode 11b, the liquid crystal molecules (not shown) are twisted into the fringe field form. Consequently, the optical axes of the liquid crystal molecules (not shown) are at a selected angle with the polarizing axis 18a. A natural light 25a passes through the polarizer 18, thereby becoming an incident light 25b proceeding to the same direction as the polarizing axis 18a. Thereafter, the incident light 25b is at an angle of 45° with a long axis of a liquid crystal molecule which is arranged in a fringe field F form. Therefore, an incident light 25c which has passed through the liquid crystal layer 17, becomes the incident light 25c which is at an angle of 45° with the polarizing axis 18a. Here, the incident light 25c which has passed through the liquid crystal layer 17 coincides with the fast(or slow) axis 19a of the λ/4 plate 19, thereby passing through the λ/4 plate 19 without change in the proceeding direction thereof. The incident light 25c which has passed through the λ/4 plate 19, is reflected by the reflective plate 20, thereby becoming a reflected light 26a.

The proceeding direction of the reflected light 26a coincides with the fast (or slow) axis of the λ/4 plate 19, thereby passing through the λ/4 plate 19 without changing the proceeding direction thereof. The proceeding direction of the reflected light 26a which has passed through the λ/4 plate 19, is at an angle of 45° with the long axis of the liquid crystal molecule on the liquid crystal layer 17 and therefore the proceeding direction of a reflected light which has passed through the liquid crystal layer 17, coincides with the polarizing axis 18a. Therefore, a screen is in a white state.

Conventional reflective type liquid crystal display device has not required a backlight as light source and optical component such as the λ/4 plate 19 has been added to the outside of a substrate thereof to improve a contrast.

However, the manufacturing cost is increased as the optical component such as the λ/4 plate is added. Moreover, the λ/4 plate absorbs some of an incident light or a reflected light, thereby deteriorating transmissivity of the LCD, i.e. the reflectance.

SUMMARY OF THE INVENTION

Accordingly, an object of this invention is to provide a reflective type liquid crystal display device having a good contrast ratio and a good reflectance without an additional optical component.

To accomplish the aforementioned object of this invention, the present invention according to a first embodiment provides a reflective type FFS-LCD including: a liquid crystal layer having a plurality of the liquid crystal molecules; a first substrate disposed on one side of the liquid crystal layer and in which a counter electrode and a pixel electrode, both for generating a fringe field to drive the liquid crystal molecules are formed; a second substrate disposed on the other side of the liquid crystal layer; a first homogeneous alignment layer interposed between the liquid crystal layer and the first substrate and having a rubbing axis in a selected direction; a second homogeneous alignment layer interposed between the liquid crystal layer and the second substrate, and having a rubbing axis in a selected direction; a polarizer disposed on an out side of one of the first substrate and the second substrate, and having a selected polarizing axis; and a reflective plate disposed on an out side of the other of the first substrate and the second substrate, wherein retardation of the liquid crystal layer is $(2n+1)\lambda/4$ (here, $\lambda$ is wave of light and n is a positive number).

The present invention according to another embodiment, also provides a reflective type FFS-LCD including a liquid crystal layer having a plurality of liquid crystal molecules; a first substrate disposed on one side of the liquid crystal layer and on which a counter electrode and a pixel electrode, both for generating a fringe field to drive the liquid crystal molecules are formed; a second substrate disposed on the other side of the liquid crystal layer; a first homogeneous alignment layer interposed between the liquid crystal layer and the first substrate and having a rubbing axis in a selected direction; a second homogeneous alignment layer interposed between the liquid crystal layer and the second substrate and having a rubbing axis in a selected direction anti-parallel to the rubbing axis of the first homogeneous alignment layer; a polarizer disposed on an out side of one of the first substrate and the second substrate, and having a selected polarizing axis; and a reflective plate disposed on an out side of the other substrate of the first substrate and the second substrate, wherein the rubbing axes of the first and the second alignment layers are at an angle of 10 to 85° with a substrate projection line of the fringe field, wherein retardation of the liquid crystal layer is $(2n+1)\lambda/4$ (here, $\lambda$ is wave of light and n is a positive number).

DETAILED DESCRIPTION OF THE PREFERRED EMBODIMENTS

A First Embodiment

A Reflective Type FFS-LCD of Normally White Type

Figure 1:
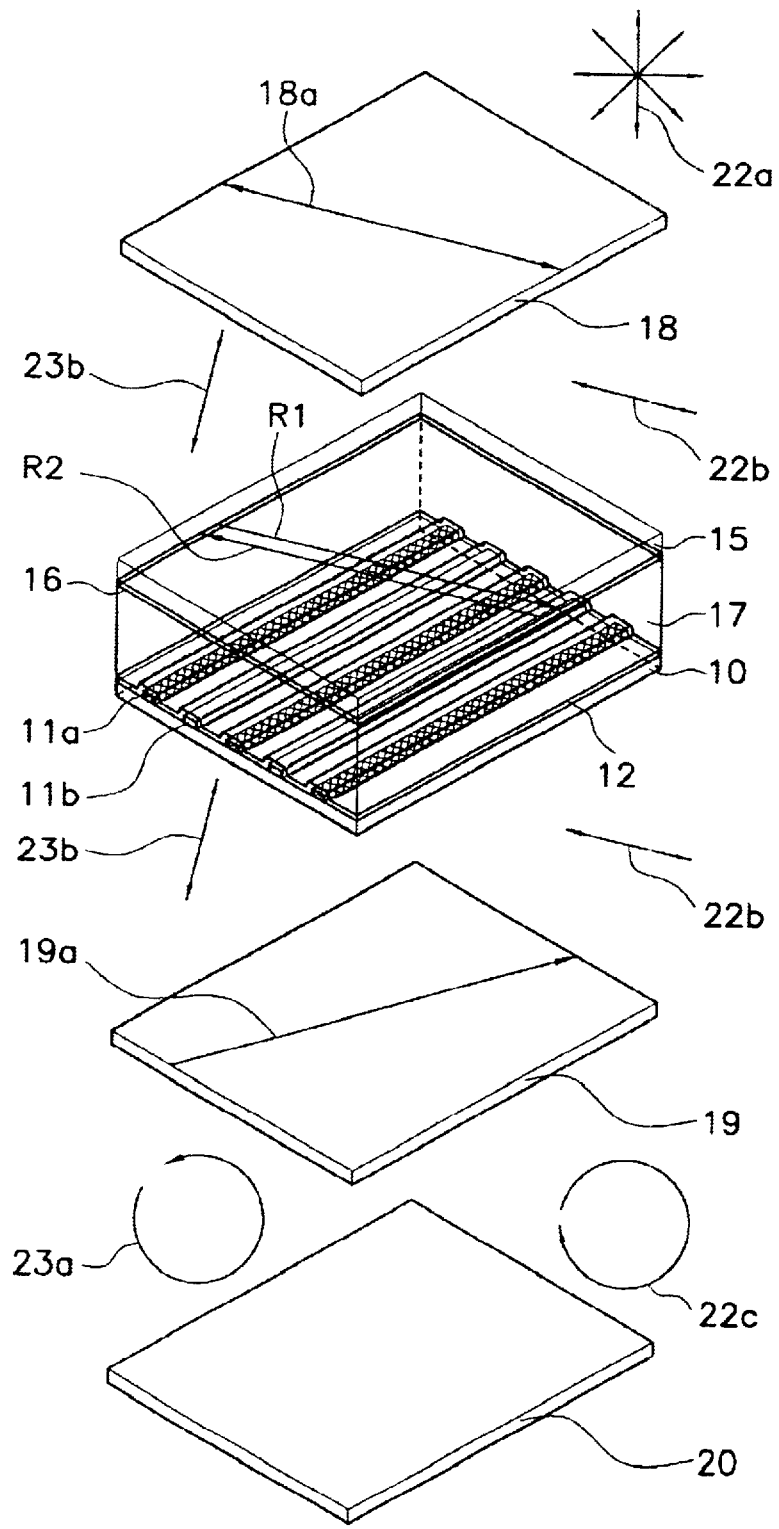
FIG. 1 is a perspective view showing a conventional reflective type FFS-LCD when electric field is off.
Figure 2:
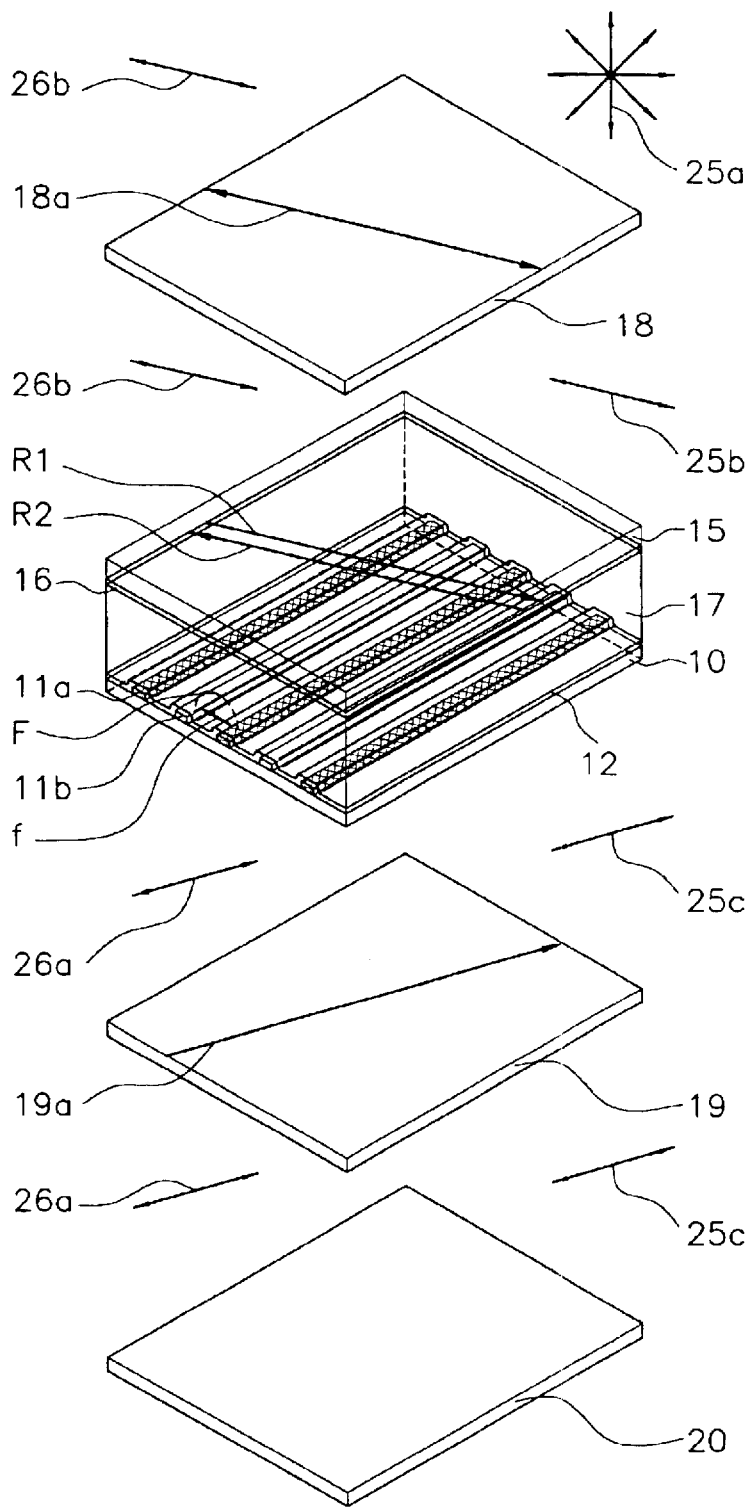
FIG. 2 is a perspective view showing a conventional reflective type FFS-LCD when a fringe field is applied.
Figure 3:
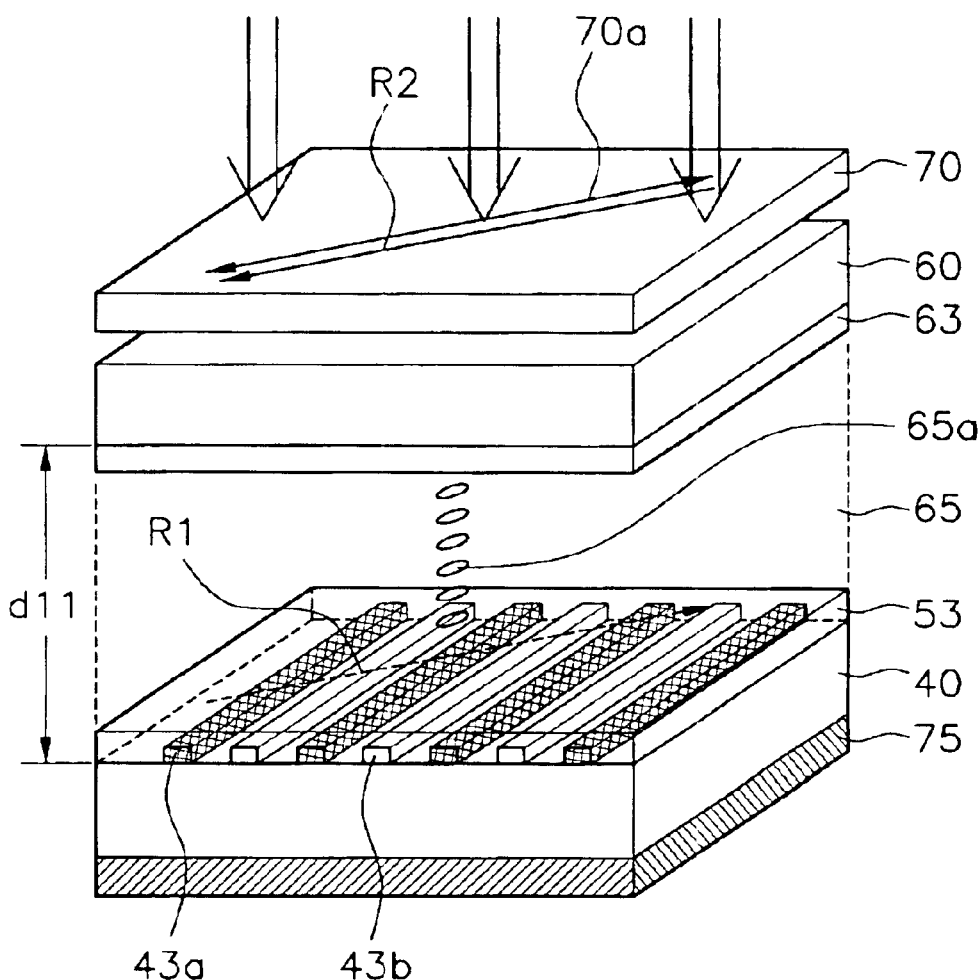
FIG. 3 is a perspective view of a reflective type FFS-LCD according to a first embodiment of this invention.

FIG. 3 is a perspective view of a reflective type FFS-LCD according to this invention. Referring to FIG. 3, a lower substrate 40 is opposed to an upper substrate 60 with a selected distance d11 (hereinafter, cell gap). A liquid crystal layer 65 including a plurality of liquid crystal molecules 65a, is interposed between the lower 40 substrate and the upper substrate 60. At this time, a liquid crystal molecule 65a of the liquid crystal layer 60 is nematic, and dielectric anisotropy may be positive or negative. In this embodiment, for example, material of positive dielectric anisotropy is used. And, retardation of the liquid crystal layer 65, i.e. the product of the cell gap d11 and the index of refraction anisotropy of the liquid crystal molecule 65a, is $(2n+1)\lambda/4$.

Figure 4:
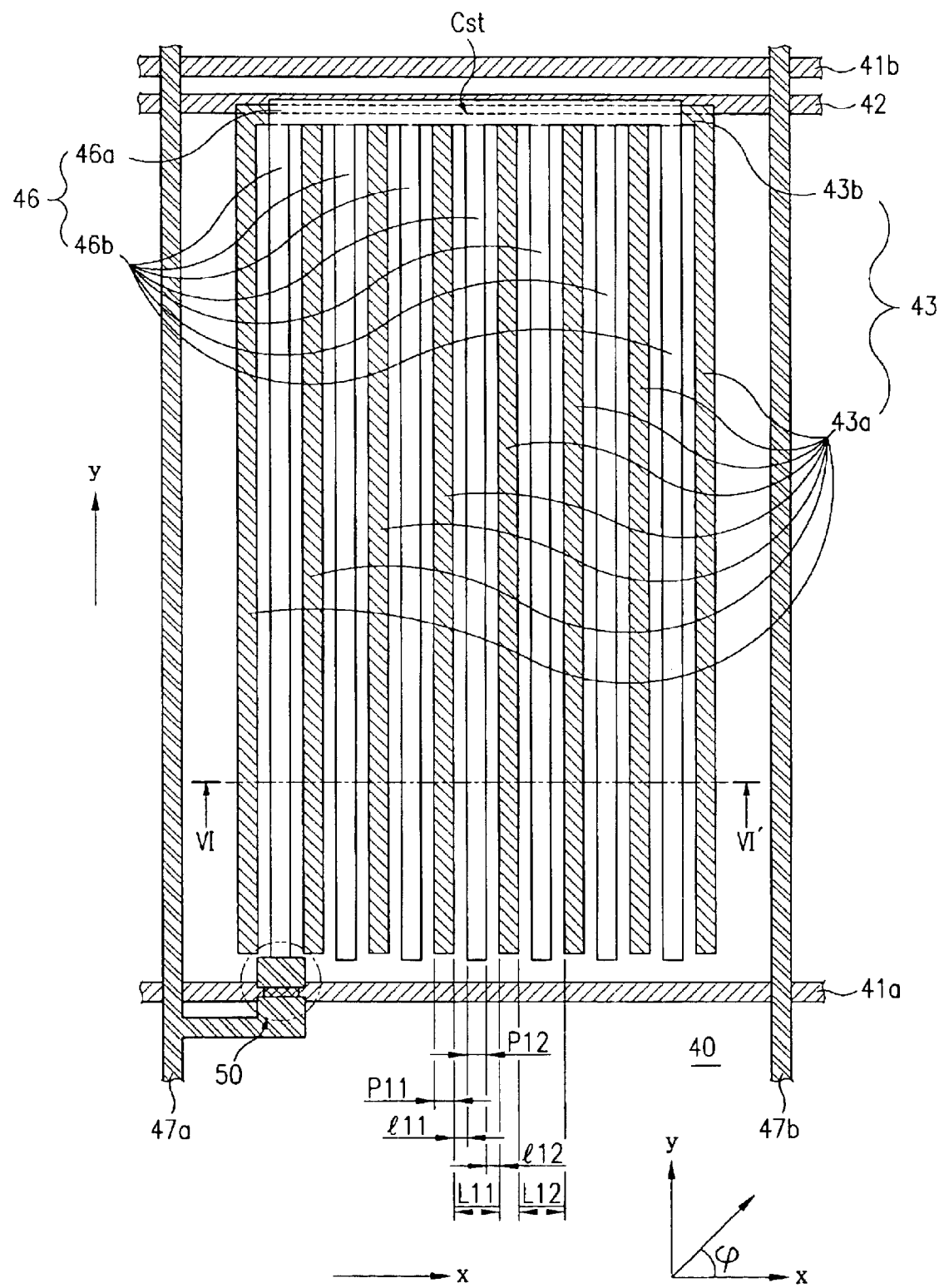
FIG. 4 is a plan view of a lower substrate according to the first embodiment of this invention.

A counter electrode 43a and a pixel electrode 46a are disposed on the inside surface of the lower substrate 40 so as to form a fringe field to drive the liquid crystal molecule 65a. Here, the inside plane structure of the lower substrate 40 on which the counter electrode 43a and the pixel electrode 46 is formed, is presented in FIG. 4. Referring to FIG. 4, a plurality of gate bus lines 41a, 41b are extended and arranged to an x direction of a drawing with a selected interval on the lower substrate 40. And, a plurality of data bus lines 47a, 47b are also extended to a y direction of a drawing with a selected interval on the lower substrate 40, thereby defining a unit pixel with the gate bus lines 41a, 41b. In a drawing, only a pair of gate bus lines 41a, 41b and a pair of data bus lines 47a, 47b are illustrated. A gate insulating layer 44 is sandwiched between the gate bus lines 41a, 41b and the data bus lines 47a, 47b thereby insulating themselves from each other. A common signal line 42 is extended to some direction, for example, to the x direction, and located between a pair of the gate bus lines 41a, 41b. For example, it is desirable that the common signal line 42 is disposed in a location closer to the previous gate bus line 41b than gate bus line 41a selecting a pixel. Here, to shorten RC delay time, the gate bus liens 41a, 41b, the common signal line 42 and the data bus lines 47a, 47b are formed out of a metal layer or more than two alloy layers among groups which are composed of Al, Mo, Ti, W, Ta, Cr having relatively good conductive property and combinations thereof.

A counter electrode 43 is formed at each unit pixel of the lower electrode 43. Here, the counter electrode 43 is formed on the surface of the lower substrate 40 and formed so as to be contacted with the common signal line 42. The counter electrode 43 is contacted with the common signal line 42 and therefore applied of the common signal. At this time, the counter electrode 43 includes a plurality of branches 43a which are extended parallel with the data bus lines 47a, 47b, and a body part 43b connecting groups of the branches 43a.

At this time, the body part 43b is in part contacted with the common signal line 42. Here, the respective branches 43a have a selected width P11 and are spaced each other with a selected distance L11. The width P11 and the distance L11 of the branches 43b are decided by considering the width of a pixel electrode and the distance with a pixel electrode which will be formed later.

A pixel electrode 46 is also formed at each unit pixel of the lower substrate 40. At this time, the pixel electrode 46 is formed on a gate insulation layer 44 so as to be overlapped with the counter electrode 43. The pixel electrode 46 includes strips 46a which are respectively disposed between the branches 43a of the counter electrode 43 and a bar 46b which is overlapped with the body part 43b of the counter electrode 43 connecting groups of the strips 46a. At this time, strips 46a have a selected width P12 and are spaced each other with a selected distance L12. And, the widths P12 of the strips 46a may be equal to or narrower than interval L11 of the branches 43a. The strips 46b are located between the branches 43b of the counter electrode. Here, the strip 46a of the pixel electrode 46 and the branch 43a of the counter electrode 43 are separated by a selected distance. To form a fringe field, it is desirable that interval between the strip 46b of the pixel electrode 46 and the branch 43b of the counter electrode 43 is narrower than that of the cell gap d11, and for example, when the size of unit pixel is 110 μm×330 μm, is formed to above 0.1 μm to below 5 μm. And, the widths P11,P12 of those electrodes 43a, 46a should be formed such that the liquid crystal molecules in the upper portions of the electrodes 43a, 43b are sufficiently driven by the fringe field formed between electrodes 43a, 46a. In addition, the ratio of the width P12 of the strip 46a of the pixel electrode 46 to the width P11 of the branch 43a of the counter electrode 43 is 0.2 to 4 or so. Here, the width and distance of the branches 43a of the counter electrode 43 and the strips 46a of the pixel electrode are adjustable according to the size of unit pixel, and number of the same. However, the widths of the electrodes 43a, 46a should be formed such that the liquid crystal molecules in the upper of the electrodes 43a, 46a are sufficiently driven by the fringe field between the electrodes 43a, 46a.

A thin film transistor 50, a switching device, is formed near a crossing point of the gate bus lines 41a, 41b and the data bus lines 47a, 47b. The thin film transistor 50 switches the signal of the data bus line 47a to the pixel electrode 46 when selecting the gate bus line 41a.

A storage capacitor Cst occurs in the part which the counter electrode 43 and the pixel electrode 46 are overlapped, the part which the body part 43b of the counter electrode 43 and the bar 46b of the pixel electrode 46 are overlapped. This storage capacitor Cst acts to maintain data signal during a frame.

Meanwhile, a color filter (not shown) is arranged on the inside surface of the upper substrate 60.

And, a first alignment layer 53 is formed on the resultant of the lower substrate 40, and a second alignment layer 63 is formed at an inner surface of the color filter on the upper substrate 60. The first and the second alignment layers 53,63 have the surfaces on which liquid crystal molecule 65a is arranged to a selected direction. The first and the second alignment layers 53,63 are the homogeneous alignment layers which are treated so that the liquid crystal molecule has a pretilt angle of 0 to 10°, and have the rubbing axes R1,R2 respectively. Here, the rubbing axis R1 of the first alignment layer 53 is at a selected angle (Ψ) with the direction of an x axis (hereinafter, projection line of a fringe field). At this time, the angle which the rubbing axis R1 of the first alignment layer 53 and the direction of the x axis (hereinafter, projection line of a fringe field) form, is adjusted in the range of 10 to 85° according to the dielectric anisotropy so as to obtain the maximum transmissivity. The rubbing axis R2 of the second alignment layer 63 is anti-parallel to the rubbing axis R1 of the first alignment layer 53, that is, rubbed so as to have the angle difference of about 180°.

And, a polarizer 70 is disposed on the outside surface of the upper substrate 60, and a polarizing axis 70a is disposed parallel to the rubbing axes R1,R2. A reflective plate 75 is disposed on the out side of the lower substrate 40. At this time, the reflective plate 75 acts to reflect an incident light to 180°.

And, an optical component such as a λ/4 plate which has been added to conventional reflective type FFS-LCD, is not added to the reflective type FFS-LCD of this invention. Instead, the liquid crystal layer 65 serves as λ/4 plate by adjusting retardation of the liquid crystal layer 65.

The reflective FFS-LCD of this invention having this composition operates as following.

Figure 5:
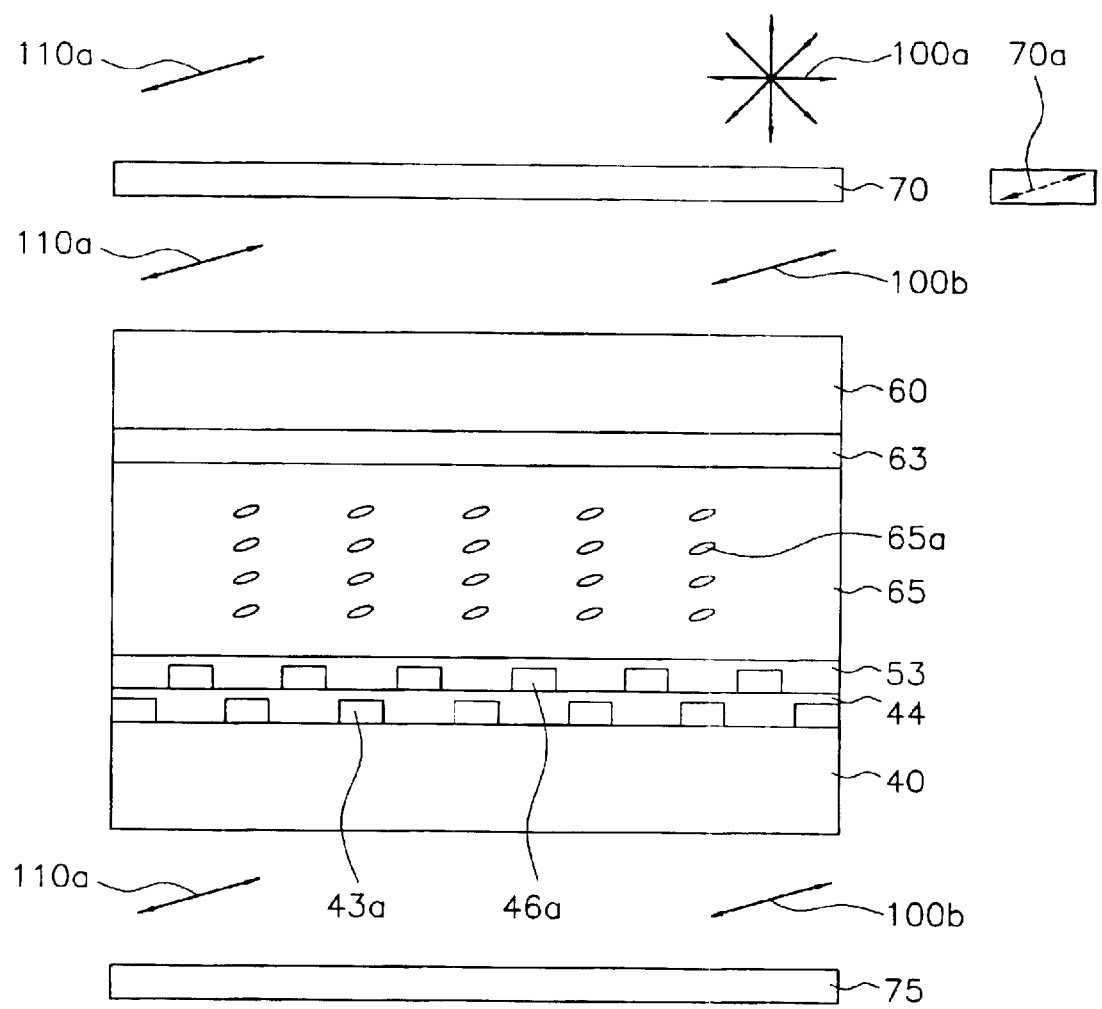
FIG. 5 is a drawing describing operation of a reflective type FFS-LCD according the first embodiment of this invention when the electric field is off.

First, when the gate bus line 41a is not selected, the signal of the data bus line 47a is not transmitted to the pixel electrode 46b, therefore a fringe field between the counter electrode 43 and the pixel electrode 46b is not formed. Consequently, a long axis is parallel to the rubbing axes R1,R2 so that the liquid crystal molecules 65a within the liquid crystal layer 65 are arranged almost parallel to a surface of a substrate. Then, a natural light 100a, as illustrated in FIG. 5, becomes an incident light 100b proceeding to an equal direction to the polarizing axis 70a by the polarizer 70. The incident light 100b passes through the liquid crystal layer 65 which is arranged so that the rubbing axes R1,R2 and the long axis of the liquid crystal molecule are equal, and the proceeding direction thereof is not changed. The incident light 100b which has passed through the liquid crystal layer 65, is reflected by the reflective plate 75, thereby becoming a reflected light 110a.

The reflected light 110a passes through the liquid crystal layer 65 again and the proceeding direction thereof is not changed. Consequently, the proceeding direction of the reflected light 110a is equal to the polarizing axis 70a of the polarizer 70, thereby passing through the polarizer 70. Accordingly, a screen is in a white state.

Meanwhile, when a scanning signal is transmitted to the gate bus line 41a and a display signal is transmitted to the data bus line 47a, a thin film transistor 50 which is formed near a crossing point of the gate bus line 41a and the data bus line 47a, is turned on and therefore transmitted to the pixel electrode 46. At this time, a common signal having a different voltage from the display signal is continuously applied to the counter electrode 43, and therefore a fringe field F is formed between the counter electrode 43 and the pixel electrode 46 and on the upper of the electrode 43,46. Furthermore, when the fringe field F is projected to the lower substrate 40, the fringe field F and polarizing axis 70a make a selected angle. Consequently, the liquid crystal molecule 65a is arranged so that the fringe field and the long axis or the optical axis thereof are parallel. Therefore, retardation occurs in the liquid crystal layer 65 by $(2n+1)\lambda/4$ (here, n is a positive number).

Figure 6:
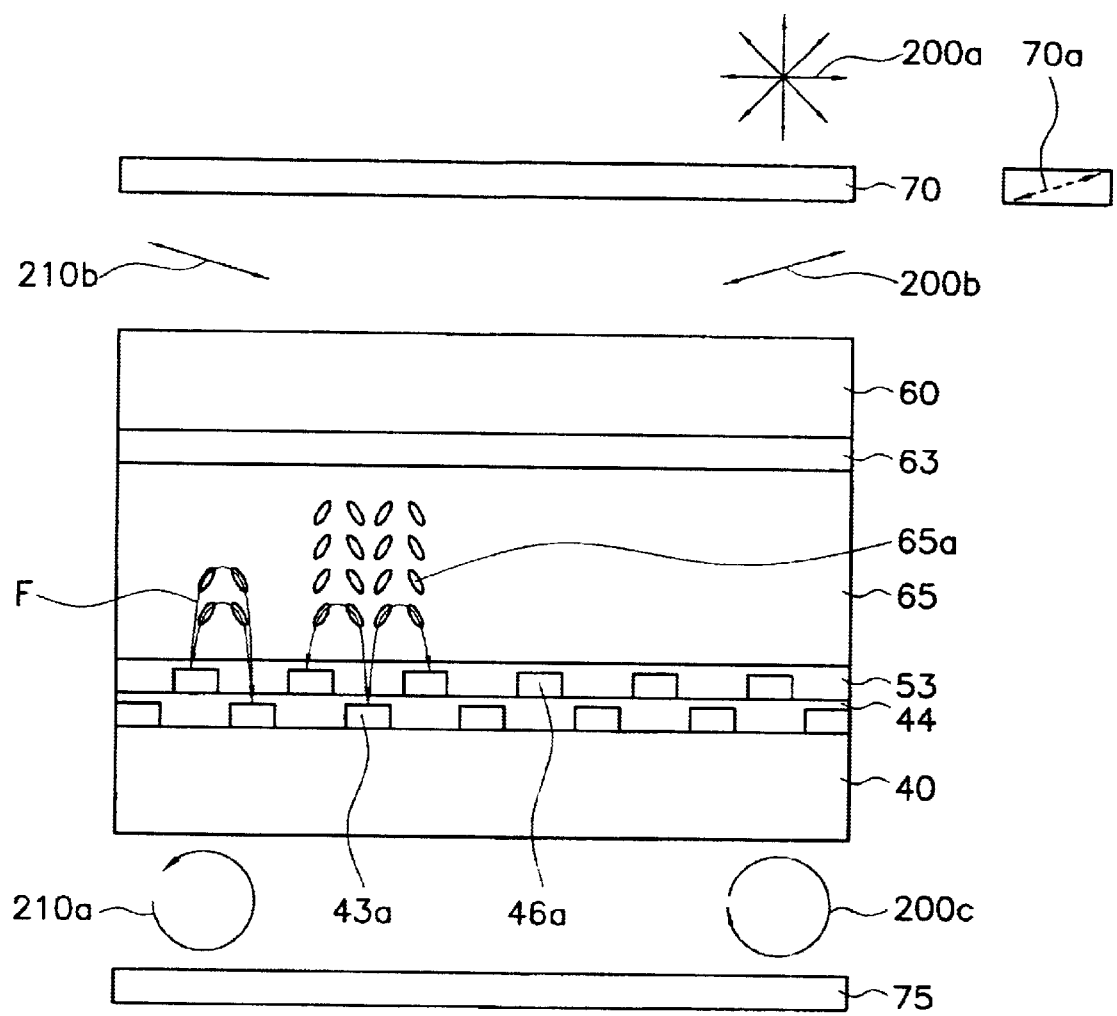
FIG. 6 is a drawing describing the operation of a reflective type FFS-LCD according to a first embodiment of this invention.

Then, a natural light 200a, as illustrated in FIG. 6, becomes an incident light 200b equal to the polarizing axis by passing through the polarizer 70. The incident light 200b which has passed through the polarizer 70 passes through the liquid crystal layer 65 having retardation of $(2n+1)\lambda/4$, and therefore the proceeding direction thereof is changed, thereby becoming a right-circularly polarized incident light 200c. The right-circularly polarized incident light 200c is reflected by the reflective plate 75, thereby becoming a reflected light 210a being left-circularly polarized.

The reflected light 210a becomes a reflected light 210b orthogonal to the polarizing axis 70a by retardation of the liquid crystal layer 65 again. Consequently, a screen is in a dark state. Therefore, a display can be realized by normally white method without the $\lambda/4$ plate.

Embodiment 2

Reflective Type FFS-LCD by Normally Black Method

Figure 7:
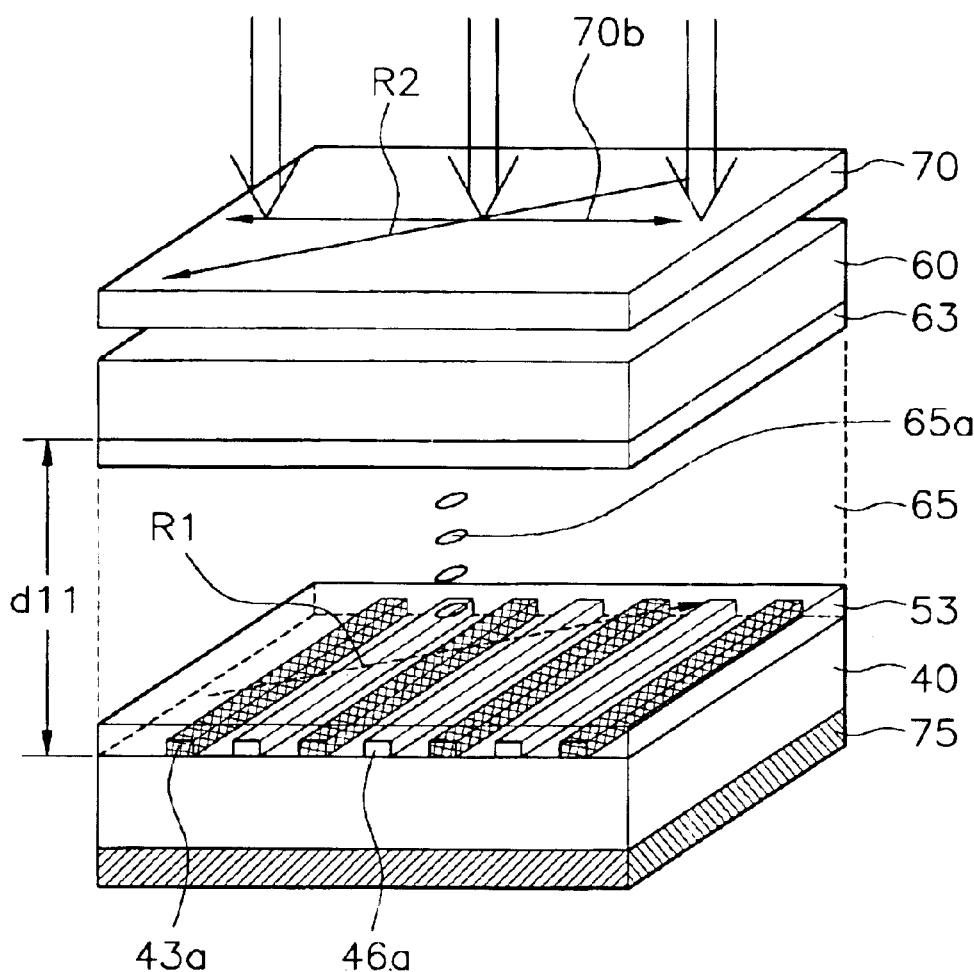
FIG. 7 is a perspective view of a reflective type FFS-LCD according to a second embodiment of this invention.

FIG. 7 is a perspective view of a reflective type FFS-LCD according to a second embodiment of this invention. In this embodiment, a structure of the lower substrate 40, a structure of the upper substrate 60, the liquid crystal layer 65 and the reflective plate 75 are equal to those in the first embodiment and only disposition of the polarizer 70 is different. A polarizing axis 70b of the polarizer 70 is at a selected angle, preferably 45°, with the rubbing axes R1,R2 so that a reflective FFS-LCD according to this embodiment, as illustrated in FIG. 7, is operated by a normally black method.

Operation of this reflective FFS-LCD by the normally black method is described.

Figure 8:
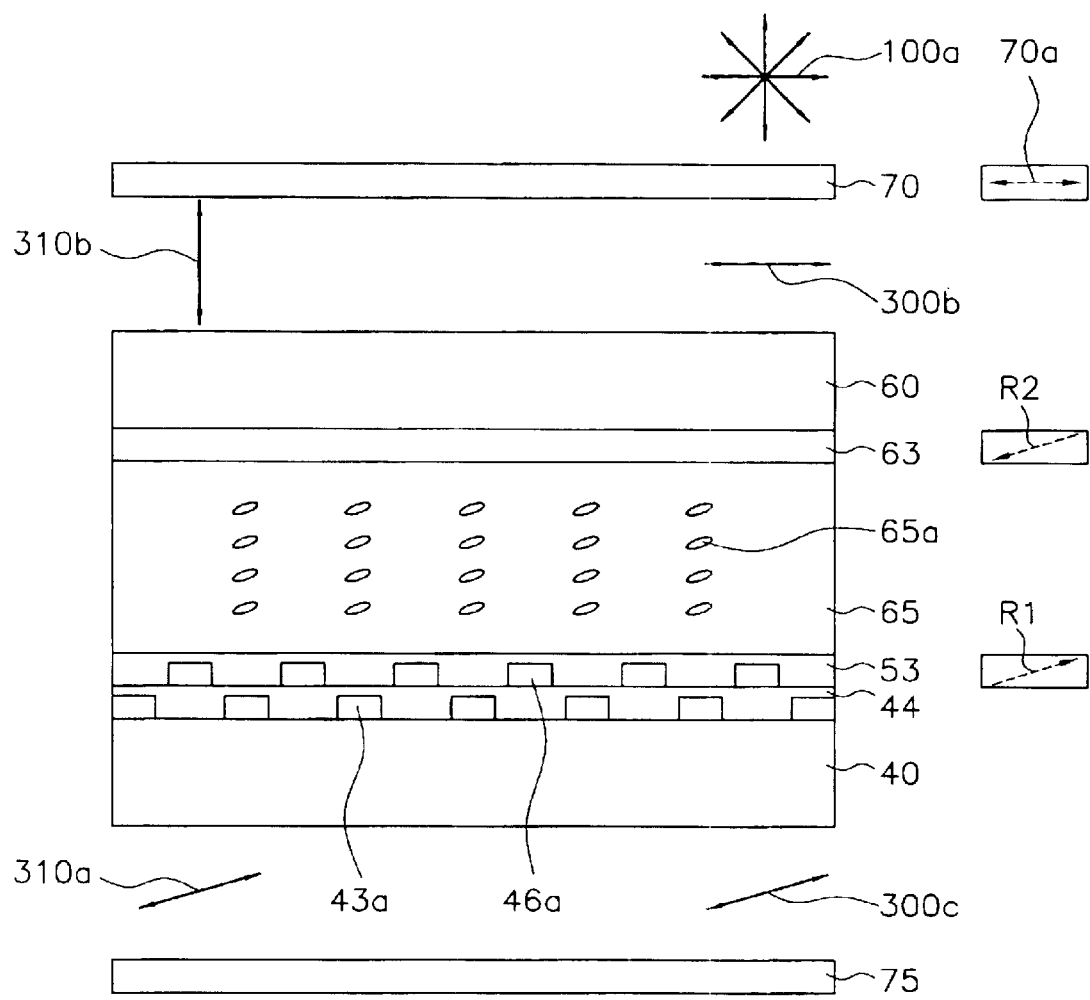
FIG. 8 is a drawing describing operation of a reflective type FFS-LCD according to the second embodiment of this invention when the electric field is off.

First, before a fringe field is formed, long axes of the liquid crystal molecules 65a coincide with the rubbing axes R1,R2 and are arranged almost parallel to the substrates. Then, a natural light 300a, as illustrated in FIG. 8, by the polarizer 70, becomes an incident light 300b proceeding to an equal direction to the polarizing axis 70a. The incident light 300b is at an angle of 45° with the long axis of the liquid crystal molecule, thereby becoming an incident light 300c proceeding to an equal direction to the rubbing axes R1,R2, passing through the liquid crystal layer 65. The incident light 300c which has passed through the liquid crystal layer 65 is reflected by the reflective plate 75, thereby becoming a reflected light 310a.

The proceeding direction of the reflected light 310a is at an angle of 45° with the long axis of the liquid crystal molecule 65a, thereby becoming a reflected light 310b orthogonal to a polarizing axis 70b, passing through the liquid crystal layer 65. The proceeding direction of the reflected light 310b which has passed through the liquid crystal layer 65 is perpendicular to the axis of the polarized light 70b, thereby not passing through the polarizer 70. Accordingly, a screen is in a dark state.

Figure 9:
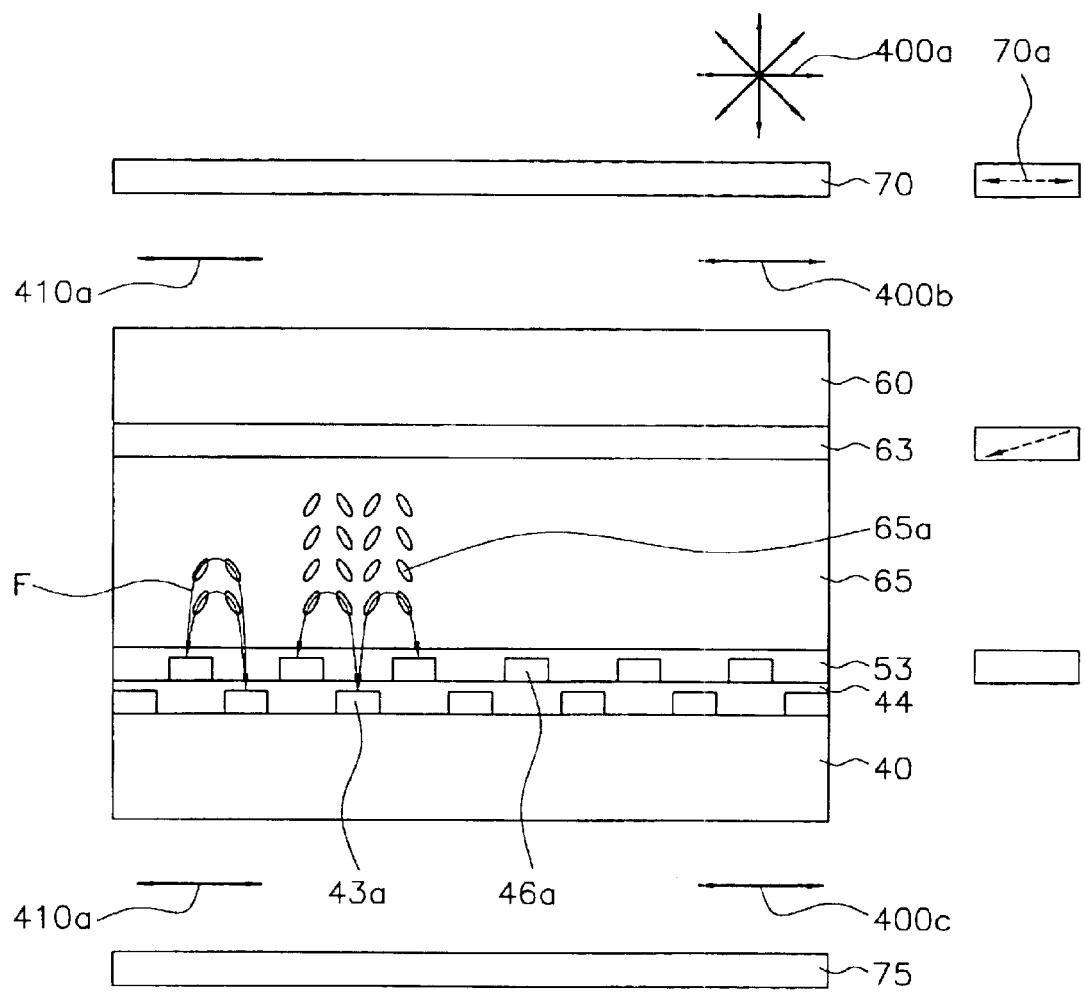
FIG. 9 is a drawing describing operation of a reflective type FFS-LCD according to a second embodiment of this invention when a fringe field is applied.

Meanwhile, when a fringe field F is formed, the liquid crystal molecule 65a is arranged so that the fringe field F and the long axis or the short axis thereof are parallel, and therefore retardation occurs in the liquid crystal layer 65 by $(2n+1)\lambda/4$ (here, n is a positive number). A natural light 400a, as illustrated in FIG. 9, becomes an incident light 400b equal to the polarizing axis 70b by passing through the polarizer 70. The incident light 200b which has passed through the polarizer 70 is equal to the long axis of the liquid crystal molecule 65a which is twisted by the fringe field F, thereby passing through the liquid crystal layer 65 without changing its polarization state. An incident light 400c which has passed through the liquid crystal layer 65 is reflected by the reflective plate 75, thereby becoming a reflected light 410a.

The reflected light 410a is equal to the optical axis of the liquid crystal molecule 65 which is arranged in a fringe field form, thereby passing through the liquid crystal layer 65 without changing its polarization state. The proceeding direction of the reflected light 410a which has passed through the liquid crystal layer 65 is equal to the polarizing axis 70b, thereby passing through the polarizer 70. Accordingly, a screen is in a white state. Consequently, a display can be realized by the normally black method without using the $\lambda/4$ plate.

Figure 10:
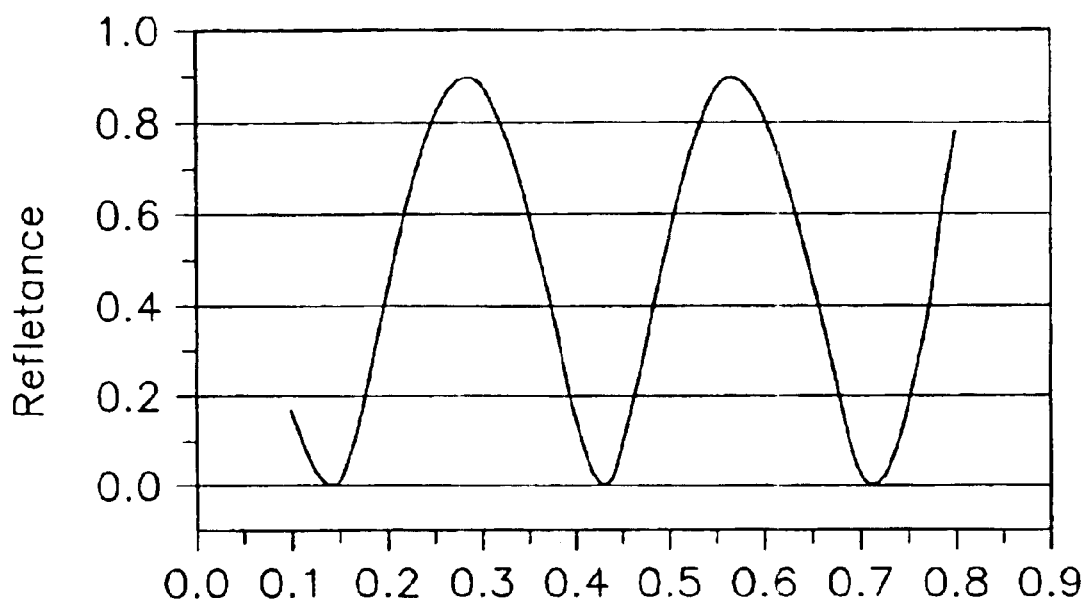
FIG. 10 is a graph showing a reflectance in accordance with a retardation (d$\Delta$n) in a reflective type FFS-LCD accordance with this invention.

FIG. 10 of the drawings is a graph showing reflectance in accordance with retardation (d$\Delta$n) in a reflective type FFS-LCD according to an embodiment of the present invention. According to FIG. 8, for example when $\lambda$ is 570 nm, the reflectance points vary periodically between 0 and 0.9 as shown in FIG. 10. At the reflectance point of 0, the retardation is $(2n+1)\lambda/4$, and at the reflectance point of 0.9, the retardation is $2n\lambda/4$. Consequently, when retardation of the liquid crystal layer 65 is $(2n+1)\lambda/4$ (i.e., at each reflectance point of 0), a display can be realized without the $\lambda 4$ plate.

Figure 11:
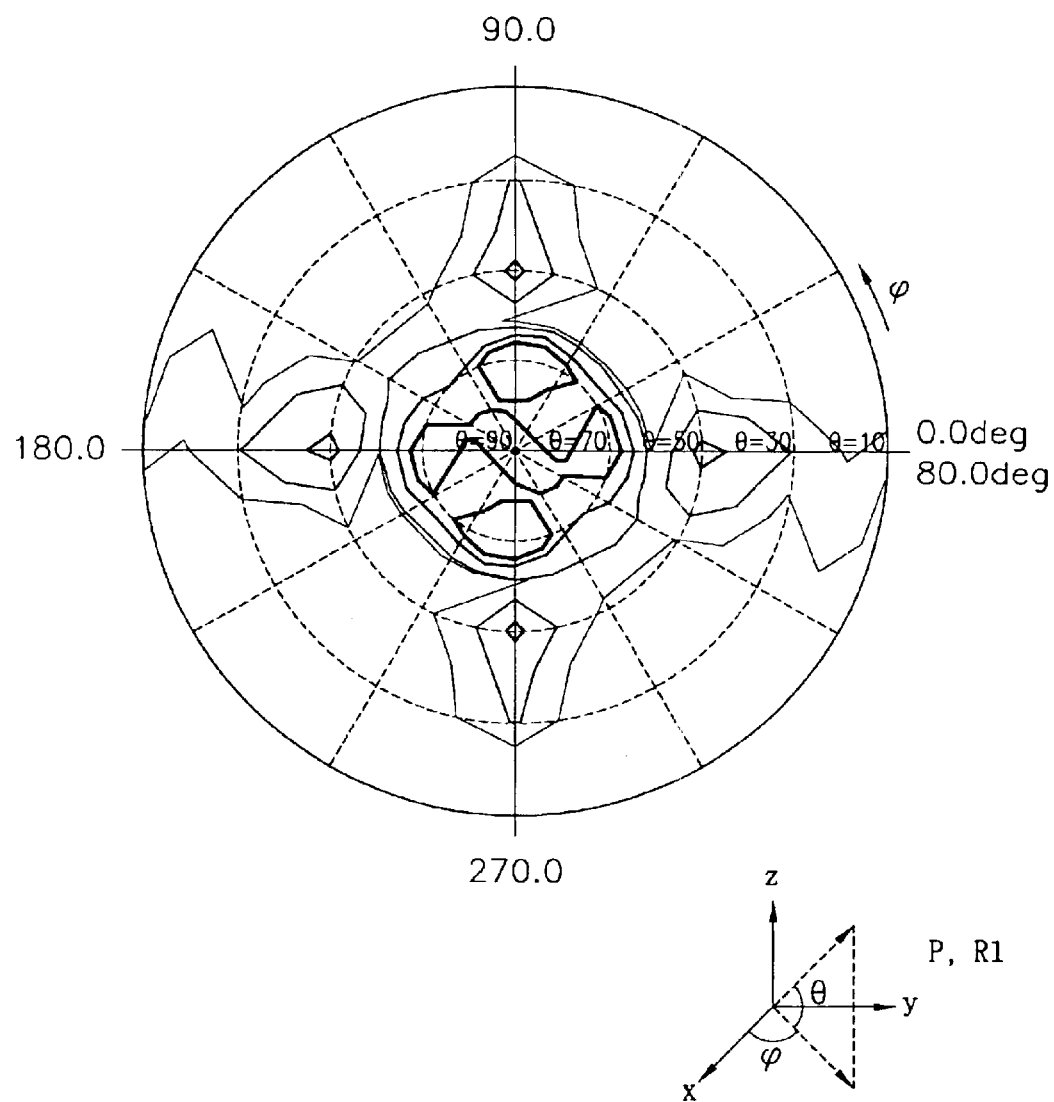
FIG. 11 is a graph showing a contrast ratio according to an azimuth in a reflective type FFS-LCD of this invention.

FIG. 11 is a graph showing contrast ratio according to azimuth in a reflective type FFS-LCD of this invention. According to FIG. 11, when polar angle ($\theta$) is more than 30°, contrast ratio is more than 10, and therefore good contrast ratio can be obtained without the $\lambda/4$ board.

This invention is not limited to the embodiments as described above.

For example, according to the embodiments of this invention, the pixel electrode and the counter electrode are formed in the comb forms. However, being not limited to this, the pixel electrode and the counter electrode can be formed in any form so as to form a fringe field.

A reflective type FFS-LCD of this invention has effects as following.

First, in reflective type FFS-LCD, retardation (d$\Delta$n) is caused to become $(2n+1)\lambda/4$ in the liquid crystal layer. Consequently, the liquid crystal layer serves as a conventional $\lambda/4$ plate, thereby not requiring to form an extra $\lambda/4$ plate. Accordingly, intensity of light increases and price decreases.

Moreover, the liquid crystal molecules between the counter electrode and the pixel electrode and on the upper of the electrodes, are all operated by the fringe field, and therefore reflectance of a reflective type FFS-LCD is further improved.

Various other modifications will be apparent to those skilled in the art and can be easily carried out without departing from the spirit and the scope of the present invention as defined by the accompanying claims.

What is claimed is:

1. A reflective type fringe field switching mode liquid crystal display ("a reflective FFS-LCD") comprising:

a liquid crystal layer having a plurality of the liquid crystal molecules and having the thickness of a cell gap;

a first substrate disposed on one side of the liquid crystal layer and a counter electrode having a counter electrode width and a pixel electrode having a pixel electrode width formed on the first substrate, wherein the counter electrode and the pixel electrode are separated by a predetermined distance that is less than the cell gap thickness to generate a fringe field to drive the liquid crystal molecules;

a second substrate disposed on the other side of the liquid crystal layer;

a first homogeneous alignment layer interposed between the liquid crystal layer and the first substrate and having a rubbing axis in a selected direction;

a second homogeneous alignment layer interposed between the liquid crystal layer and the second substrate, and having a rubbing axis in a selected direction;

a polarizer disposed on an outer surface of one of the first substrate and the second substrate, and having a selected polarizing axis; and a reflective plate disposed on an outer surface of the other of the first substrate and the second substrate, wherein retardation in the liquid crystal layer is caused to occur in the absence of a quarter wave plate for retarding incident light by $\lambda/4$ when the liquid crystal molecules in the liquid crystal layer are driven by the fringe field and wherein $\lambda$ is about 570 nm.

2. The reflective type FFS-LCD according to claim 1, wherein a rubbing axis of the first homogeneous alignment layer and a rubbing axis of the second homogeneous alignment layer are anti-parallel each other.

3. The reflective type FFS-LCD according to claim 1, wherein the rubbing axes of the first and the second alignment layers and a polarizing axis of the polarizer coincide.

4. The reflective type FFS-LCD according to claim 1, wherein the rubbing axes of the first and the second alignment layers and the polarizing axis of the polarizer are at an angle of 20 to 60°.

5. The reflective type FFS-LCD according to claim 4, wherein the rubbing axes of the first and the second alignment layers and the polarizing axis of the polarizer are at an angle of 45°.

6. The reflective type FFS-LCD according to claim 1, wherein the ratio of the pixel electrode width and the counter electrode width is between 0.2 to 4 to generate the fringe field in the liquid crystal layer.

7. A reflective FFS-LCD comprising:

a liquid crystal layer having a plurality of liquid crystal molecules and having the thickness of a cell gap;

a first substrate disposed on one side of the liquid crystal layer and a counter electrode having a counter electrode width and a pixel electrode having a pixel electrode width formed on the first substrate, wherein the counter electrode and the pixel electrode are separated by a predetermined distance that is less than the cell gap thickness to generate a fringe field to drive the liquid crystal molecules;

a second substrate disposed on the other side of the liquid crystal layer;

a first homogeneous alignment layer interposed between the liquid crystal layer and the first substrate and having a rubbing axis in a selected direction;

a second homogeneous alignment layer interposed between the liquid crystal axis in a selected direction anti-parallel to the rubbing axis of the first homogeneous alignment layer;

a polarizer disposed on an outer surface of one of the first substrate and the second substrate, and having a selected polarizing axis; and a reflective plate disposed on an outer surface of the other substrate of the first substrate and the second substrate, wherein the rubbing axes of the first and the second alignment layers are at an angle of 10 to 85° with a substrate projection line of the fringe field, wherein retardation in the liquid crystal layer is caused to occur in the absence of a quarter wave plate for retarding incident light by $\lambda/4$ when the liquid crystal molecules in the liquid crystal layer are driven by the fringe field and wherein $\lambda$ is about 570 nm.

8. The reflective type FFS-LCD according to claim 7, wherein the rubbing axes of the first and the second alignment layers and a polarizing axis of the polarizer coincide.

9. The reflective type FFS-LCD according to claim 7, wherein the rubbing axes of the first and the second alignment layers and the polarizing axis of the polarizer are at an angle of 20 to 60°.

10. The reflective type FFS-LCD according to claim 9, wherein the rubbing axes of the first and the second alignment layers and the polarizing axis of the polarizer are at an angle of 45°.

11. The reflective type FFS-LCD according to claim 7, wherein the ratio of the pixel electrode width and the counter electrode width is between 0.2 to 4 to generate the fringe field in the liquid crystal layer.

* * * * *